United States Patent [19]

Janello et al.

[11] Patent Number: 5,392,830
[45] Date of Patent: Feb. 28, 1995

[54] PROTECTIVE BARRIER FOR TIRE SIDEWALL

[75] Inventors: Thomas A. Janello, Tallmadge; Richard W. Loesch, Akron; Gary M. Wade, Findlay, all of Ohio

[73] Assignee: General Tire, Inc., Akron, Ohio

[21] Appl. No.: 29,104

[22] Filed: Mar. 10, 1993

[51] Int. Cl.6 .......................... B60C 15/06
[52] U.S. Cl. .................... 152/543; 152/546; 152/555
[58] Field of Search ............. 152/517, 550, 555, 548, 152/539, 546, 543

[56] References Cited

U.S. PATENT DOCUMENTS

| | | | |
|---|---|---|---|
| 3,386,486 | 6/1968 | Kovac et al. | 152/543 |
| 3,800,844 | 4/1974 | Boileau | 152/555 |
| 3,888,292 | 6/1975 | Menell et al. | 152/555 |
| 4,023,608 | 5/1977 | Meiss | 152/543 |
| 4,287,929 | 9/1981 | Huinink | 152/354 |
| 4,573,511 | 3/1986 | Kabe et al. | 152/548 |
| 4,854,362 | 8/1989 | Carolla et al. | 152/555 |
| 4,890,660 | 1/1990 | Lamock | 152/555 |
| 5,078,192 | 7/1992 | Lindsey | 152/555 |

FOREIGN PATENT DOCUMENTS

| | | | |
|---|---|---|---|
| 0256059 | 10/1963 | Australia . | |
| 2340310 | 2/1975 | Germany | 152/555 |
| 0152605 | 11/1980 | Japan . | |
| 0001605 | 7/1987 | Japan . | |
| 0067405 | 3/1989 | Japan . | |
| 2299905 | 12/1990 | Japan . | |
| 4201611 | 7/1992 | Japan . | |
| 4-362405 | 12/1992 | Japan | 152/555 |
| 5-058119 | 3/1993 | Japan | 152/555 |
| 1722901 | 3/1992 | Russian Federation | 152/539 |
| 1062455 | 3/1967 | United Kingdom | 152/555 |
| 1072305 | 6/1967 | United Kingdom | 152/555 |
| 1154095 | 6/1969 | United Kingdom . | |
| 1565574 | 4/1980 | United Kingdom | 152/555 |

*Primary Examiner*—Michael W. Ball
*Assistant Examiner*—Nancy T. Krawczyk
*Attorney, Agent, or Firm*—Calfee Halter & Griswold

[57] ABSTRACT

A pneumatic tire is provided, comprising a substantially toroidal carcass cord layer applied to an inner liner, a tread portion surrounding a circumferential portion of the carcass cord layer and including at least one reinforcement belt, a left sidewall portion surrounding a left side of the carcass cord layer and extending from a left side of the tread portion, and a right sidewall portion surrounding a right side of the carcass cord layer and extending from a right side of the tread portion. Left and right bead portions extend, respectively, from the left and right sidewall portions, each of the bead portions including a reinforcing bead. Substantially flexible protective barriers are disposed (i) intermediate the left side of the carcass cord layer and the left sidewall portion and (ii) intermediate the right side of the carcass cord layer and the right sidewall portion, the protective barriers located a predetermined distance from the reinforcement belt so as not to be overlapped by the reinforcement belt. The substantially flexible protective barriers are comprised of a fabric material such as nylon, rayon, polyester or Aralon ®. The carcass cord layer is oriented with respect to the protective barriers so that cords in the carcass cord layer and cords in the protective barrier fabric material form an angle of between three and forty-five degrees.

9 Claims, 3 Drawing Sheets

PROTECTIVE BARRIER FOR TIRE SIDEWALL

FIELD OF THE INVENTION

The present invention relates generally to pneumatic tires and more specifically to a protective sidewall barrier for a pneumatic tire.

BACKGROUND OF THE INVENTION

In the construction of radial ply tires, various tire components are assembled together sequentially around a tire building drum. The assembled components are shaped around the drum into the desired toroidal form of the tire. The shaped tire is then cured for added strength and durability.

The various tire components typically include a fluid impervious inner liner onto which is applied one or more corded carcass ply layers. The carcass ply layers terminate in a pair of tire beads which provide the means to mount the tire to a rim. Adjacent the one or more carcass ply layers are sidewall portions and a tread portion. The tread portion may include one or more circumferential reinforcing belts.

When the tire is in service, it is susceptible to damage due to stresses and road hazards. The portion of the tire near the tire beads resists damage because it is generally thicker than the sidewalls and receives added support from the tire rim. The tread portion is also thicker than the sidewalls and may benefit from the added strength provided by the reinforcing belts. The sidewalls of the tire are therefore more susceptible to road hazards due to their relative thinness as compared to the tire beads and tread portion. This is especially the case near the upper sidewall, which is the sidewall portion near the edge of the tread. Moreover, the directionality of the cord in the carcass plies near the upper sidewalls permits greater flexing and bulging, making this area of the tire more susceptible to in-service damage. Hence, the upper sidewall portions of the tire often contribute significantly to the overall failure rate of a radial tire.

Manners of increasing the strength of a tire sidewall are known. For example, U.S. Pat. No. 4,573,511 to Kabe, et al. provides a support layer for a tire sidewall which is applied to the structure of the carcass cord layer. The support layer overlaps the belt reinforcing layers under the tread at one end, thereby functioning as a load bearing member for tire inflation stresses. The other end of the support layer is attached to a bead portion within close proximity of the tire bead, the distance between this end of the support layer and the bead of the tire being less than three-tenths of the cross sectional height of the tire. The support layer is designed to reduce the tire weight while maintaining the high speed durability and load capacity of the tire.

U.S. Pat. No. 4,287,929 to Huinink also discloses reinforcements for tire sidewalls. A reinforcing insert consisting of a polyamide such as nylon is placed externally of the tire carcass on each side of the tire. The upper edge of each of the reinforcing inserts is sandwiched between the tire carcass and the tread belts, enabling the inserts to absorb inflation stresses, and the lower edges of the reinforcing inserts are partially wrapped around the tire bead cores.

Securing a sidewall support layer at one end under the tread, however, presents manufacturing problems, especially when modeling the tire into its final shape. The upper sidewall area of the tire near the ends of the belt reinforcing layers, due to its excessive curvature, is a difficult portion of the tire to form. Any overlap of layered material, such as the belt reinforcing layers and the sidewall support layers, within the tire near this area may cause formation defects such as trapped air pockets or a rippled outer appearance of the tire. Defects in this portion of the tire present a problem due to the significant stresses to which this portion of the tire is subjected during service. Thus, defects in this area of the tire pose a particular risk of tire failure.

A similar problem presents itself if the lower ends of the sidewall reinforcements are wrapped around the beads of the tire. Because the tire carcass is typically turned up around the tire bead, the overlapped carcass plies and the reinforcement layers may cause formation defects near this portion of the tire, such as trapped air pockets or a rippled outer appearance of the tire.

It is an object of the present invention, then, to provide a protective barrier for a tire sidewall which is located between the tire carcass and the sidewall and which provides protection against upper sidewall punctures. It is a further object of the present invention to provide a method of forming a tire having a protective sidewall barrier which substantially reduces or eliminates formation defects in the tire.

SUMMARY OF THE INVENTION

According to the present invention, a pneumatic tire is provided having left and right protective sidewall barriers which extend completely around the circumference of left and right sidewall portions of the tire. The sidewall barriers provide impact protection for the tire sidewall portions by reducing or preventing punctures thereto, and further provide improved ride characteristics for the tire. The tire additionally comprises an inner liner which forms an inner surface of the tire, a carcass cord layer comprising one or more carcass plies which are applied to the inner liner, and a tread portion intermediate the left and right sidewall portions. A pair of breakers (tread reinforcements) are located between the tread portion and the outermost carcass ply. A left bead and a right bead are provided for mounting the pneumatic tire on a rim.

The inner liner is preferably made of a rubber compound so that the inner surface of the tire is impervious to air. The carcass cord layer is applied to the inner liner to form the basic skeleton or structure of the tire and preferably comprises one or more lengths of an elastomerized fabric such as nylon, polyester, rayon or a similar reinforcing material. The fabric of the carcass cord layer includes cords which run perpendicular to the axis of the tire. After the carcass cord layer is applied to the inner liner, a splice is formed between the ends of the respective ply or plies to achieve an annular shape for the carcass cord layer. The splice is formed in a direction generally parallel to the direction of the carcass cords.

The one or more carcass plies forming the carcass cord layer are turned up (wrapped around) the left and right beads to form turned-up portions which provide reinforcement for the tire near the rim line. If more than one carcass ply is used, the width of the first carcass ply (adjacent the inner liner) is greater than the width of the second carcass ply (adjacent the breakers). Hence, when the sides of the spliced carcass plies are wrapped around the left and right beads, the turned-up portions of the first carcass ply extend beyond the turned-up portions of the second carcass ply on either side of the tire.

Bead filler material is disposed near the left and right beads between the portions of the carcass cord layer adjacent to the inner liner and the turned-up portions. The bead filler in part forms the bead portions near each of the tire beads. The left and right beads are preferably constructed from a plurality of annular wire strands. Because the carcass cords are wrapped around the beads, the cords are subject to tension when the tire is inflated, and thus the carcass cord layer provides a somewhat rigid structure for the inflated tire.

The pair of breakers are located circumferentially around the outermost carcass ply and directly inward of the tread portion of the tire. The breakers are preferably steel belts which provide reinforcement for the tread portion. The tread portion is located circumferentially on top of the breakers and is provided with a tread pattern comprised of a plurality of grooves to improve the overall traction of the tire.

The protective sidewall barriers are comprised of a fabric material and are located intermediate the carcass cord layer and the sidewall portions of the tire. The upper ends of the protective sidewall barriers are located at predetermined distances from the ends of the breakers, and the lower ends of the protective sidewall barriers extend downward toward the bead portions of the tire.

DETAILED DESCRIPTION OF THE PREFERRED EMBODIMENT

Figure 1:
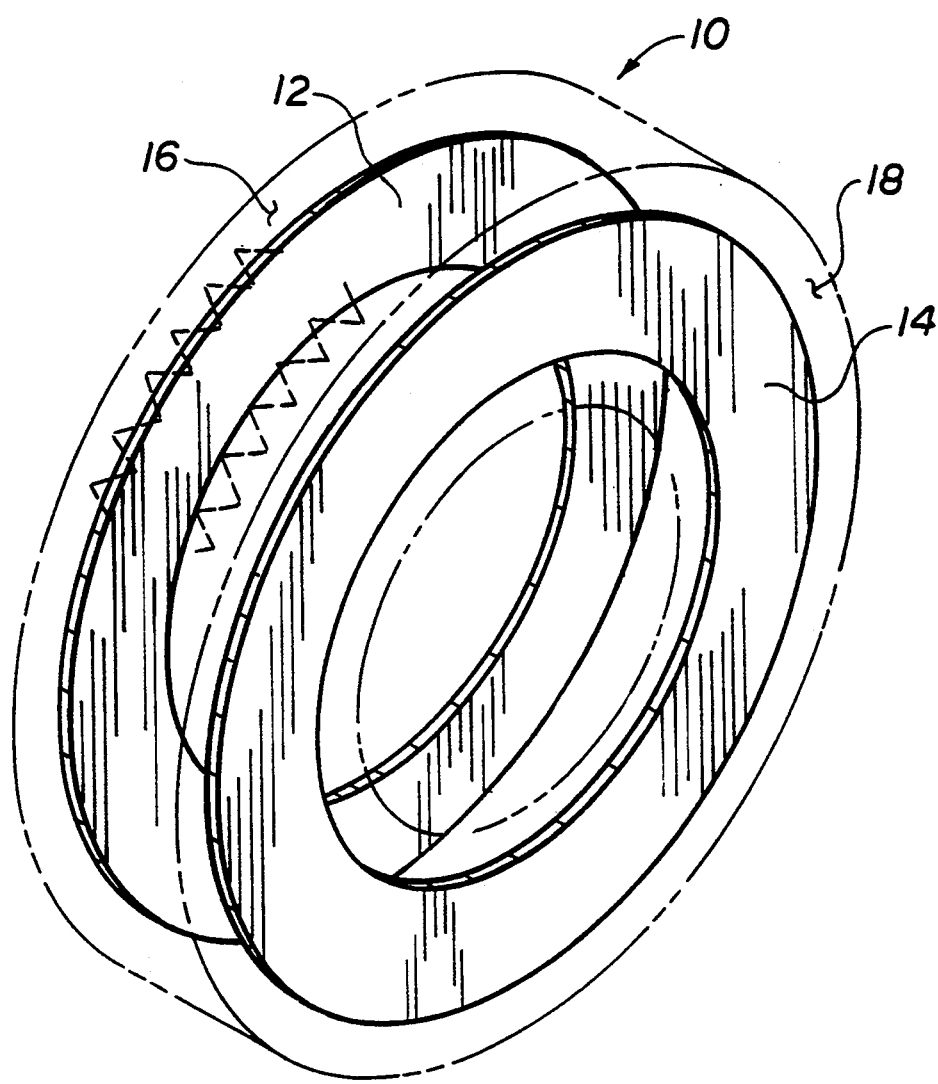
FIG. 1 is a phantom perspective view of a pneumatic tire constructed according to the principles of the present invention, showing an integral sidewall protective barrier.

Referring now to the drawings, FIG. 1 illustrates a pneumatic tire shown generally at 10 and constructed according to the principles of the present invention. The pneumatic tire 10 includes left and right protective sidewall barriers 12 and 14 which extend completely around the circumference of left and right tire sidewall portions 16 and 18, respectively, and which are formed integrally within the pneumatic tire 10. The sidewall barriers 12, 14 improve the ride characteristics of the tire and provide protection for the tire sidewall portions 16, 18 against punctures in a lateral direction. As used herein, "lateral" defines a direction which is generally parallel to a line which perpendicularly intersects both sidewalls of the tire 10.

Figure 2:
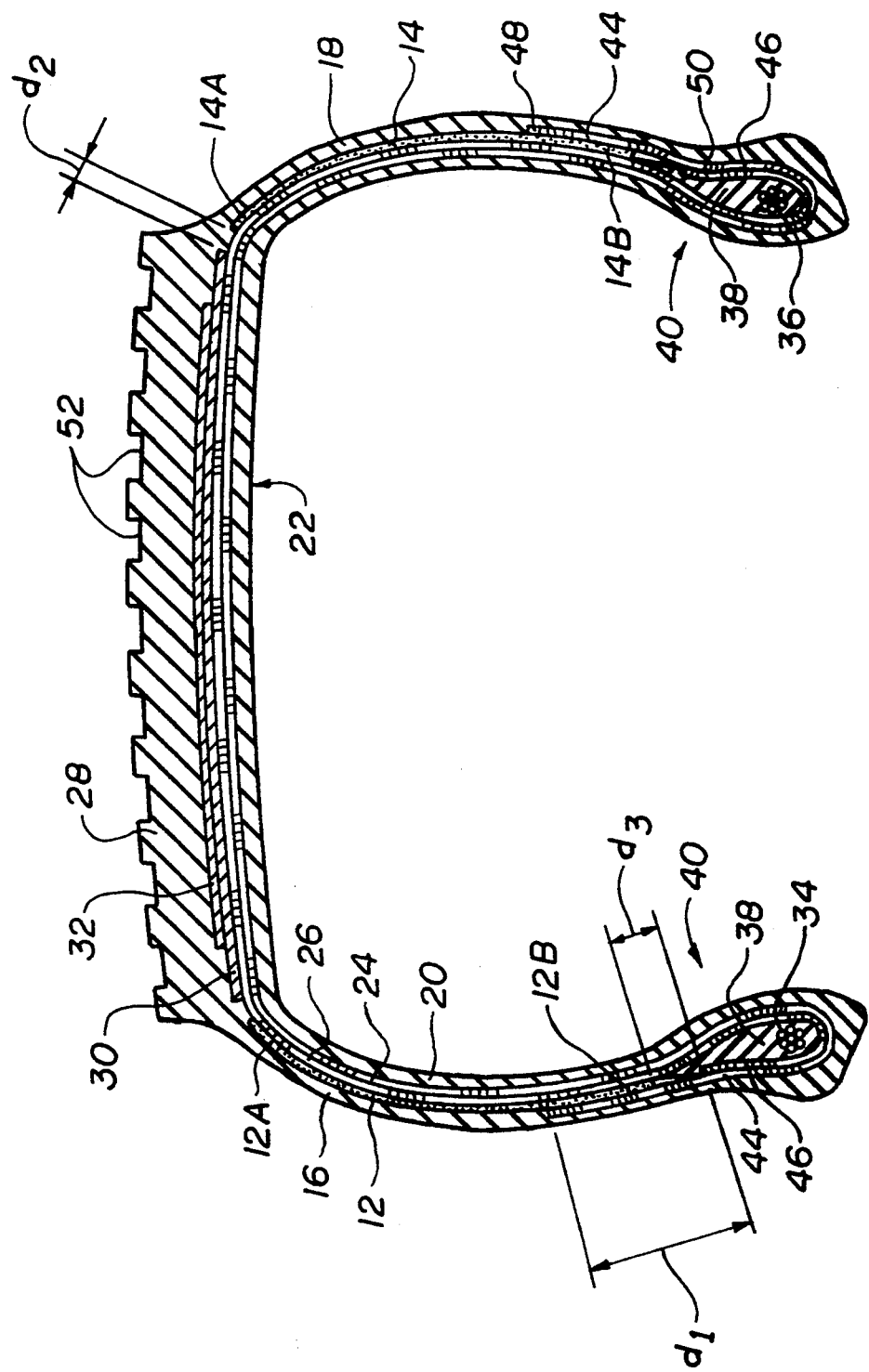
FIG. 2 is a sectional view of one embodiment of the pneumatic tire shown in FIG. 1.
Figure 3:
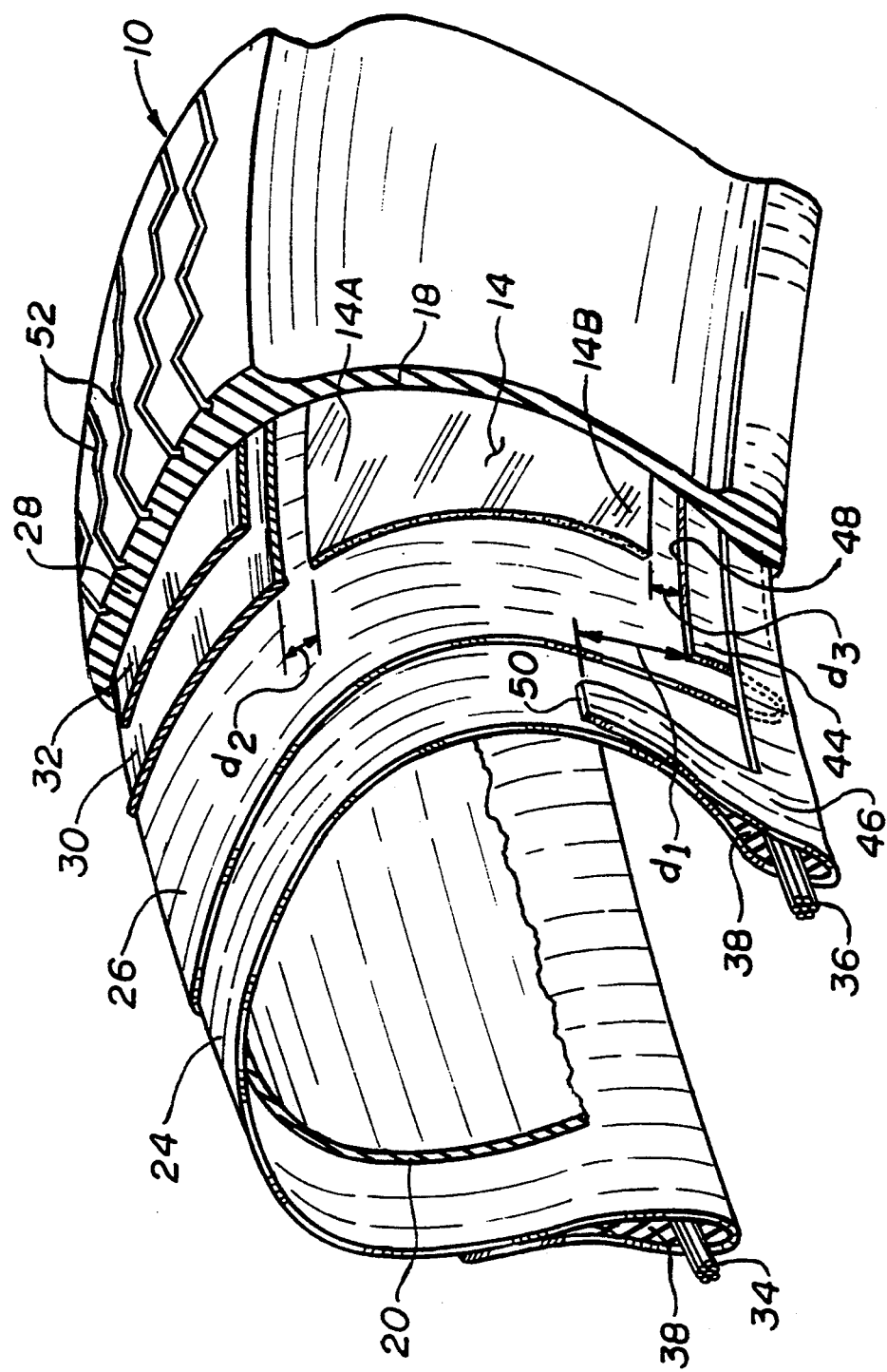
FIG. 3 is a perspective view of the embodiment of the pneumatic tire as shown in FIG. 2.

One embodiment of the present invention is shown in FIGS. 2 and 3, which illustrate the orientation of the sidewall barriers 12, 14 in relation to other components of the pneumatic tire 10. The tire 10 additionally comprises an inner liner 20 which forms an inner surface 22 of the tire, a carcass cord layer comprising first and second carcass plies 24 and 26, respectively, which are applied to the inner liner 20, and a tread portion 28 intermediate the left and right sidewall portions 16, 18. First and second breakers 30 and 32, respectively, are disposed between the tread portion 28 and the carcass cord layer. A left bead 34 and a right bead 36 are provided for mounting the pneumatic tire on a rim. Although the embodiment of the invention as shown in FIGS. 2 and 3 includes both first and second carcass plies, it is contemplated that the carcass cord layer of the tire may comprise a single carcass ply or more than two carcass plies.

The inner liner 20 is preferably made of a rubber compound so that the inner surface 22 of the tire is impervious to air. The carcass cord layer is applied to the inner liner 20 form the basic skeleton or structure of the tire. In the embodiment of FIGS. 2 and 3, first and second carcass plies 24, 26 are applied sequentially to the inner liner 20. Any of the numerous fabric materials which are typically used to reinforce tires may be used to construct the carcass ply or plies, such as (but not limited to) nylon, polyester, rayon or a similar reinforcing material. The fabric of the carcass cord layer includes cords which run in a direction which is generally perpendicular to the left and right beads 34, 36 (see FIG. 3). The lengths of carcass ply or plies forming the carcass cord layer are applied to the inner liner 20 and a splice (not shown) is formed between the ends of the respective plies to achieve an annular shape for the carcass cord layer. The splice is formed in a direction which is generally parallel to the direction of the cords in the carcass fabric.

To prevent the ply splices in the carcass cord layer from separating during assembly of the tire, one end of each of the carcass ply or plies overlaps the other end by a short distance. This overlapping, or lap splicing, is a conventional method of completing the layers of fabric plies on a tire carcass. A typical overlap is usually confined to a short distance and usually involves only a few ply cords. The distance of a typical overlap is approximately 0.07 to 0.5 inch.

To prevent sidewall indentations in the area of the splices of the carcass cord layer, the overlapping portion of the splice may be provided with a plurality of cuts extending transversely to the ends of the carcass plies. As a result, the cut cords in the ends of the plies have minimal tension when the tire is inflated, and the elongation differential between the cords at the splice and the other cords in the carcass cord layer is minimized. This type of splice helps to reduce or eliminate sidewall indentations in the inflated tire at the locations of the splices.

The carcass cord layer is turned up (wrapped around) the left and right beads 34, 36 to provide reinforcement for the tire structure near the rim line. Bead filler material 38 is disposed near the left and right beads between the portions of the carcass cord layer adjacent to the inner liner 20 and the wrapped around portions to in part from a bead portion 40 near each of the tire beads. The left and right beads are preferably constructed from a plurality of annular wire strands. Alternatively, a single strand construction may be employed. However, the strength of the beads is generally calculated by the number of strands in the bead, and thus a plurality of wire strands is preferred to optimize bead strength. Because the cords of the carcass ply or plies are wrapped around the beads, the cords are subject to tension when the tire is inflated, and thus the carcass cord layer provides a somewhat rigid structure for the inflated tire.

As shown in the two-ply embodiment of FIGS. 2 and 3, the annular shapes of the first ply 24 and the second ply 26 have different widths. The width of the first ply 24 is approximately three inches greater than the width of the second ply 26. Hence, when the sides of the spliced carcass plies 24, 26 are wrapped around the left and right beads 34, 36, first ply turned-up portions 44 and second ply turned-up portions 46 are formed, each of the portions 44 having a length which is greater than the length of portions 46. In the preferred embodiment then, the ends 48 of the first ply turned-up portions are separated from the ends 50 of the second ply turned-up portions by a distance $d^1$ of approximately one and one-half inches. Because the ends 48, 50 of the turned-up portions 44, 46 do not coincide, no hinge point is created near the bead portions 40.

The first and second breakers 30, 32 are located circumferentially around the carcass cord layer and directly inward of the tread portion 28 of the tire. The breakers are preferably steel belts which provide reinforcement for the tread portion 28, although any of a number of nonmetallic reinforcing fabrics may be used. The tread portion 28 is located circumferentially on top of the breakers 30, 32 and is provided with a tread pattern comprised of a plurality of grooves 52 to improve the overall traction of the tire.

The protective sidewall barriers 12, 14 are located intermediate the outermost carcass ply (ply 26 in FIGS. 2 and 3) and the sidewall portions 16, 18 of the tire. Preferably, the protective sidewall barriers are comprised of Aralon ®, which is a registered trademark of General Tire, Inc. for a corded woven composite aramid and nylon material. The Aralon ® composition provides the strength of aramid with the elongation of nylon, while maintaining a high cut resistance. Other materials are contemplated for use in constructing the protective sidewall barriers, however, such as rayon, polyester or nylon or other fabric materials which are typically used to reinforce tires.

The cords in the protective sidewall barriers 12, 14 are oriented in a direction which is slightly offset from the direction of the cords in the carcass plies 24, 26 of the carcass cord layer. In the preferred embodiment, the protective sidewall barriers are positioned on the tire carcass so that the angle between cords in the protective sidewall barriers 12, 14 and the cords in the outermost carcass ply is between three and forty-five degrees.

The upper ends 12A, 14A of the protective sidewall barriers 12, 14 are spaced from the ends of the breakers 30 and 32 so that they do not overlap the breakers. The distance separating upper barrier ends 12A, 14A of the from the ends of the breakers 30 and 32 is referred to as $d_2$, and in the preferred embodiment measures between three-tenths inch and two inches. The upper ends 12A, 14A of the protective sidewall barriers, however, may be positioned closer to the ends of the breakers 30, 32, and may in fact abut the breakers.

The protective sidewall barriers 12, 14 extend along the carcass cord layer toward the tire beads 34, 36. In the preferred embodiment, the protective sidewall barriers 12, 14 are applied to the outermost carcass ply as strips about two to four inches in width, measured from their upper ends 12A, 14A to their lower ends 12B, 14B. The radially extending ends of these strips are spliced in the manner described above for the carcass plies. Alternative conventional methods of splicing the protective sidewall barriers may also be employed.

In an embodiment of the invention wherein the carcass cord layer comprises a single carcass ply, the lower ends 12B, 14B of the protective sidewall barriers may either overlap or abut the turned-up portions, or they may be spaced from the turned-up portions.

In the two-ply embodiment of the invention shown in FIGS. 2 and 3, however, the lower ends 12B, 14B extend to a point which is between the ends 50 of the second ply turned-up portions 46 and the ends 48 of the first ply turned-up portions 44. The distance between the ends 12B, 14B of the protective sidewall barriers and the ends 50 of the second ply turned-up portions 46 is referred to as $d_3$. In the preferred embodiment, $d_3$ is between three-tenths inch and one inch. Alternatively, the distance $d_3$ may be approximately one-half the distance $d_1$. In another embodiment, the ends 12B, 14B may abut the ends 50 of the second ply turned-up portions 46. By positioning the lower ends 12B, 14B of the protective sidewall barriers in this manner, the lower ends 12B and 14B do not overlap the bead filler material 38. Further, the lower ends 12B and 14B do not overlap the turned-up portions 46 of the second carcass ply 26 and hence do not detract from the appearance of the tire near the bead portion 40.

The protective sidewall barriers 12 and 14 protect the tire sidewall from road hazards or punctures in a lateral direction. Thus, the protective sidewall barriers 12 and 14 help to reduce the rate of failure for the tire when in use. Further, it has been found that the incorporation of the protective sidewall barriers improves the ride characteristics of the tire 10, especially under rough road conditions.

In forming the pneumatic tire of the present invention, a length of the inner liner 20 is centered on and applied to a generally cylindrical drum (not shown) and spliced together to form an annular airtight lining for the tire. The carcass cord layer is then formed by centering on and applying to the inner liner 20 one or more carcass plies. The protective sidewall barriers 12 and 14 are then laid over and preferably stitched to the outermost carcass ply. The left and right stranded annular beads are positioned near the bead portion 40, and the bead filler material 38 is added to aid in formation of the bead portion 40 of the tire 10.

The sides of the one or more carcass plies are wrapped around the left and right beads 34, 26 and back upon the tire carcass. If only one carcass ply is used to construct the carcass cord layer, the turned up portion may overlap, abut, or be spaced from the ends 12B, 14B of the protective sidewall barriers 12 and 14. If first and second carcass plies are utilized as in FIGS. 2 and 3, the ends 12B, 14B of the protective sidewall barriers 12 and 14 are preferably spaced from the ends 50 of the turned-up portions 46 of the second ply 26. The ends 12B, 14B are also preferably overlapped by the turned-up portions 44 of the first ply 24.

To complete the formation of the pneumatic tire 10, the tire carcass is expanded to a toroidal shape, and the breakers 30, 32 are applied circumferentially around the outermost carcass ply. The rubber composition tire sidewalls 16, 18, and tread portion 28 are applied around the carcass. Finally, the tire is placed in a suitable mold and cured Accordingly, the preferred embodiment of a protective barrier for a tire sidewall has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

We claim:

1. A pneumatic tire, comprising:
   a substantially toroidal two-ply carcass cord layer comprising a second ply overlying a first ply,
   a tread portion surrounding a circumferential portion of said carcass cord layer and having a left side and a right side, said tread portion including at least one reinforcement belt;
   a left sidewall portion surrounding a left side of said carcass cord layer and extending from said left side of said tread portion;
   a right sidewall portion surrounding a right side of said carcass cord layer and extending from said right side of said tread portion;
   left and right bead portions extending, respectively, from said left and right sidewall portions, each of said bead portions including a reinforcing bead, said first and second carcass cord layer plies being wrapped around said reinforcing beads to forms respectively, first ply turn-up portions and second ply turn-up portions, respective ends of said first ply turn-up portions being spaced from ends of said second ply turn-up portions, said first turn-up portions extending further from said reinforcing beads than said Second turn-up portions; and
   substantially flexible protective barriers comprised of a composite aramid and nylon material disposed (i) intermediate said left side of said carcass cord layer and said left sidewall portion and (ii) intermediate said right side of said carcass cord layer and said right sidewall portion, said protective barriers each having a first end and a second end, said first ends of said protective barriers each being spaced from said reinforcement belt so as not to be overlapped by said reinforcement belt, said second ends of said protective barriers being located between said respective ends of said first ply turn-up portions and said second ply turn-up portions and at least partially overlying sides of said first ply turn-up portions which face said carcass cord layer.

2. The pneumatic tire of claim 1, wherein said second ply is provided with cords which are generally perpendicular to said reinforcing beads, said second ply cords and cords in said fabric material forming an angle of between three and forty-five degrees.

3. The pneumatic tire of claim 1, wherein said respective ends of said first ply turn-up portions are spaced from said second ply turn-up portions by a distance of between one and three inches, and wherein said second ends of said protective barriers are located approximately halfway between said respective ends of said first ply turn-up portions and said second ply turn-up portions.

4. The pneumatic tire of claim 1, wherein said second ends of said protective barriers are spaced from said ends of said second ply turn-up portions by a distance of between three-tenths inch and one inch.

5. The pneumatic tire of claim 1, wherein said second ends of said protective barriers abut said ends of said second ply turn-up portions.

6. The pneumatic tire of claim 1, wherein said protective barriers are stitched to said second ply of said carcass cord layer.

7. The pneumatic tire of claim 6, wherein said protective barriers are between two and four inches in width, as measured from said first ends to said second ends.

8. The pneumatic tire of claim 7, wherein said protective barriers are between two and four inches in width, as measured from said first ends to said second ends.

9. A pneumatic tire, comprising:
   a substantially toroidal single-ply carcass cord layer,
   a tread portion surrounding a circumferential portion of said carcass cord layer and having a left side and a right side, said tread portion including at least one reinforcement belt;
   a left sidewall portion surrounding a left side of said carcass cord layer and extending from said left side of said tread portion;
   a right sidewall portion surrounding a right side of said carcass cord layer and extending from said right side of said tread portion;
   left and right bead portions extending, respectively, from said left and right sidewall portions, each of said bead portions including a reinforcing bead, said single-ply carcass cord layer being wrapped around said reinforcing beads to form ply turn-up portions; and
   substantially flexible protective barriers comprised of a composite aramid and nylon material disposed (i) intermediate said left side of said carcass cord layer and said left sidewall portion and (ii) intermediate said right side of said carcass cord layer and said right sidewall portion, said protective barriers each having a first end and a second end, said first ends of said protective barriers each being spaced from said reinforcement belt so as not to be overlapped by said reinforcement belt, said second ends of said protective barriers at least partially overlapping sides of said ply turn-up portions which face said carcass cord layer.

* * * * *